Sept. 10, 1963           J. McEWAN           3,103,134
STOP MEANS FOR CHAIN SAW SHARPENER
Filed March 5, 1962           2 Sheets-Sheet 1
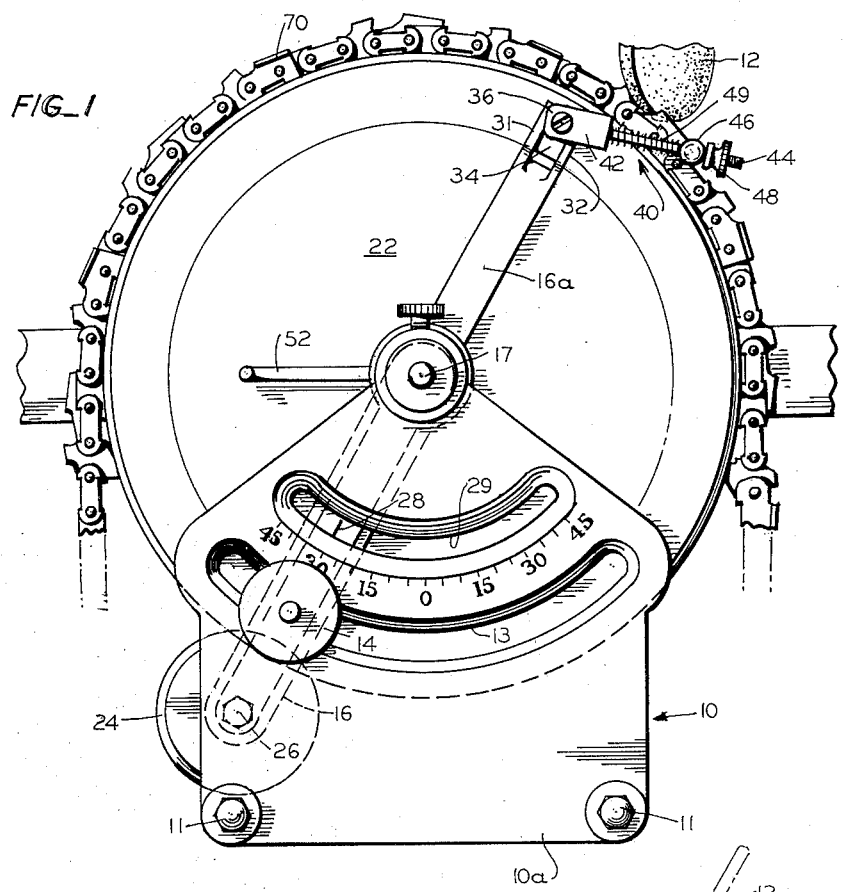
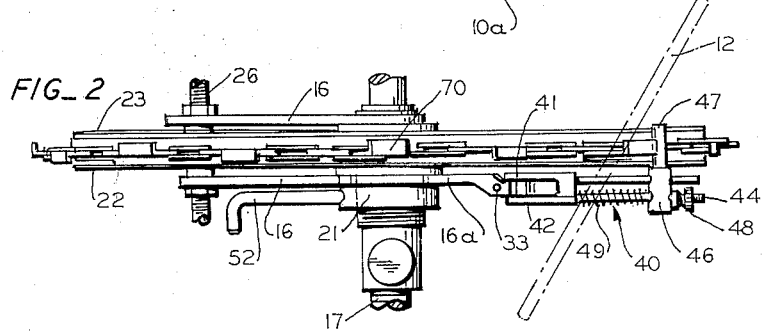
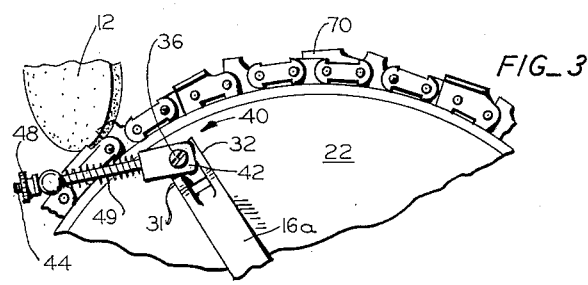
INVENTOR.
JAMES McEWAN
BY
*Allen and Chromy*
ATTORNEYS

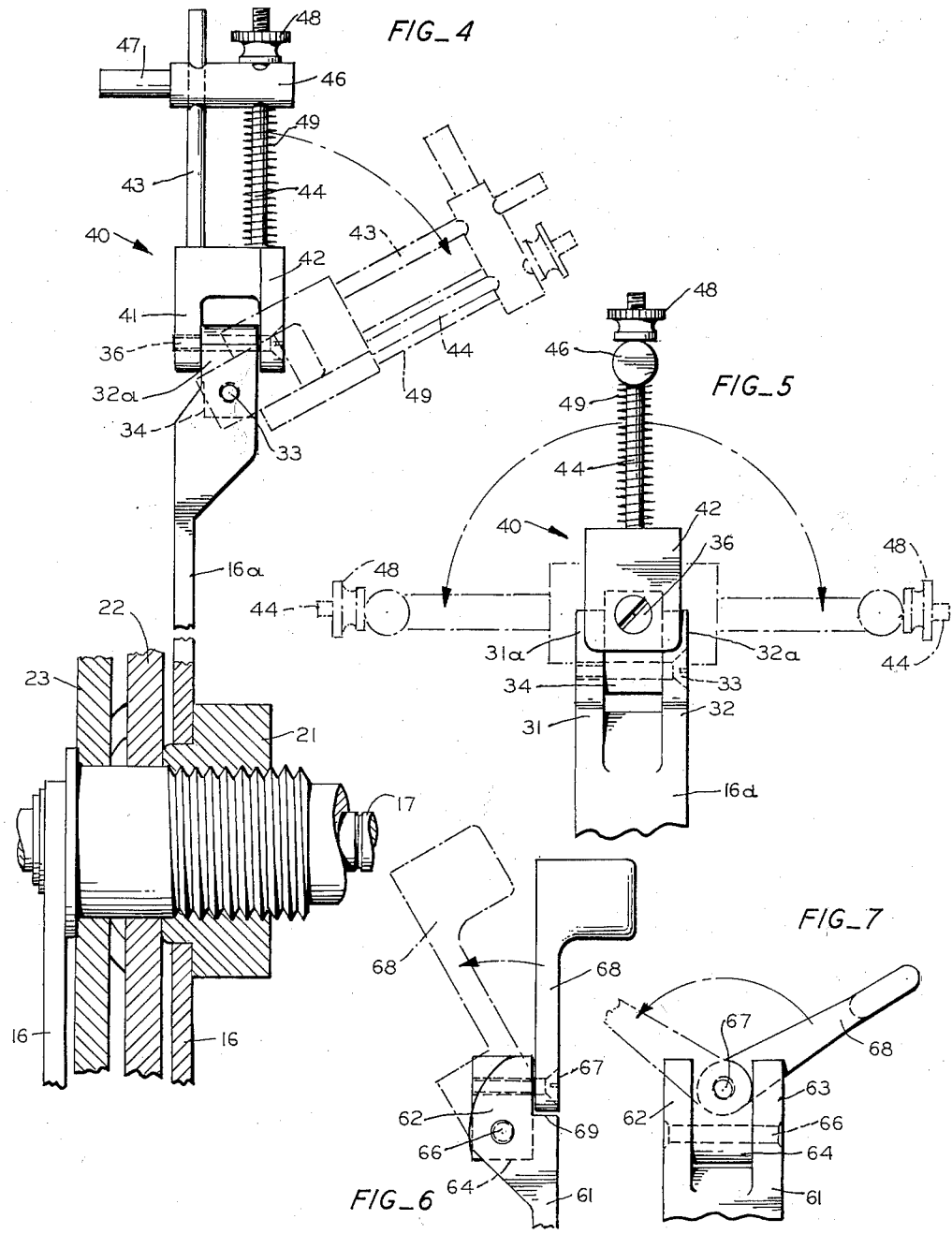

United States Patent Office 3,103,134
Patented Sept. 10, 1963

3,103,134
STOP MEANS FOR CHAIN SAW SHARPENER
James McEwan, 138 Stockton St., San Jose, Calif.
Filed Mar. 5, 1962, Ser. No. 177,568
8 Claims. (Cl. 76—37)

The present invention relates to apparatus for sharpening chain saws and is concerned more particularly with an improved apparatus incorporating an adjustable stop member which can be engaged with and hold a chain saw being sharpened, irrespective of which side of the teeth of the chain saw is being sharpened.

The invention is applied as shown to apparatus of the character disclosed and claimed in my Patent No. 3,006,222, issued October 31, 1961.

In chain saw sharpeners, it is desirable to employ a sharpener in which the teeth of the chain saw are successively brought into sharpening position by manual operation, and in the past it has been customary to have the saw and the sharpening apparatus held manually during the sharpening operation, and this requirement has placed an undue burden on the operator and has slowed down the sharpening operation.

In accordance with the instant invention, a stop member is provided for the chain saw during sharpening and this stop is made adjustable in its mounting so that it can be brought into engagement with the chain saw in either direction of movement of the chain saw in being placed in position for sharpening.

It is therefore a general object of the invention to provide an improved apparatus for the sharpening of the teeth of a chain saw.

It is a further object of the invention to provide improved apparatus wherein the chain saw can be moved in an endless fashion between two converging clamping elements, and cooperating with these clamping elements and the saw is adjustable stop means which can be placed into engagement with the chain saw in either direction of movement in moving from one sharpening position to another.

A further object of the invention is to provide improved stop of the above character which is adjustable to provide ready positioning of the stop in a desired location with respect to a particular tooth to be sharpened or a particular chain saw to be sharpened.

Another object of the invention is to provide stop means for a chain saw in a sharpener apparatus of the above character in which, when the stop is disengaged from the chain saw, it is in a positively located, out-of-the-way position.

Further objects and advantages of the invention will be apparent from the following description of certain preferred embodiments thereof, taken in connection with the accompanying drawings, in which:

FIG. 1 is a front elevational view of a part of the sharpening apparatus for a chain saw embodying the instant invention;

FIG. 2 is a plan view of the apparatus as shown in FIG. 1;

FIG. 3 is a fragmentary elevational view similar to FIG. 1 but showing another position of the stop or holding means of the present invention;

FIG. 4 is an enlarged elevational view, partially in section, of the stop shown in FIG. 1 and illustrating its inactive out-of-the-way position;

FIG. 5 is an enlarged elevational view similar to FIG. 1 but in fragmentary form and illustrating in dotted lines the various positions of the stop element of the chain saw sharpener;

FIG. 6 is a fragmentary elevational view of a modified form of the stop means;

FIG. 7 is a view of the stop means shown in FIG. 6 taken from the left of FIG. 6;

Referring to FIGS. 1 and 2, the chain saw sharpener of the instant invention includes a frame casting 10 provided with a depending flange portion 10a which is apertured to receiving mounting bolts 11 for securing on the frame of the sharpening apparatus which carries a grinding wheel 12, shown in fragmentary fashion in FIG. 1. The casting 10 is provided with an arcuate slot 13, providing means for passage of a clamping hand screw 14 for clamping an arm 16 which is pivoted at its upper end about the mounting shaft 17 which also passes through the upper portion of the frame casting 10. The shaft 17 provides mounting means for a pair of clamping disks 22 and 23, the disk 22 being secured to the shaft 17 by a clamp screw 21 adjusted by means of a handle 52 and the disk 23 being free for rotative and tilting movement thereon.

The above structure is of the character disclosed in said Patent No. 3,006,222 and operates in the same manner. As there explained, the clamping disks 22 and 23 comprise a pair of endless holding elements and have a region or point of convergence opposite the wheel 24 where they will positively engage the adjacent links of a chain saw in accordance with the position of a clamping wheel 24 which is carried at the lower end of a pair of arms 16 in which the pin 26 of the clamping wheel 24 is mounted. The arm 16 as seen in the view in FIG. 1 has an index mark 28 fused to a slot 29 in the casting 10 and cooperating with a set of index marks or graduations reading to 45 degrees in either direction from the central zero point indicating the angular position of the clamping arms 16.

One of these clamping arms 16 (FIGS. 1 and 5) extends upwardly beyond the pivot shaft 17 and is bifurcated at its upper end to provide opposite spaced apart portions 31 and 32 which are extended in parallel fashion in a direction perpendicular to the plane of the arm 16 and which are apertured and threaded respectively to receive a pivot screw 33, which is engaged within the pivoting aperture in the block 34 of a width to mount freely but closely between the bifurcations or portions 31 and 32. It will be noted that the axis of the pivot screw 33 is perpendicular to the axis of rotation of the disks 22 and 23, and also parallel to the plane of the arm 16, 16a. The block 34 carries a pivot screw 36 adjacent its upper end having its axis substantially coinciding with the plane containing the ends of the portions 31 and 32, and this screw 36 extends perpendicularly to the screw 33 in all of its positions, and in the position shown in full lines in FIGS. 4 and 5, extends perpendicular to the plane of the arm 16—16a. This screw 36 is secured in the opposite sidewall portions 41 and 42 of a U-shaped mounting member, indicated generally at 40, and the space between the inner walls of these spaced-apart portions 41 and 42 of the member 40 is only slightly greater than the width of the reduced upper ends 32a and 31a of the portions 32 and 31, the wall portion 42 being wider than the spacing between these portions 31 and 32, as seen in FIG. 5, and the opposite wall portion 41 being of a width to pass between these portions so that the stop mounting member 40 can be swung from the full line position shown in FIG. 4 to the dotted line position thereof when the lower edges of the wall portion 42 engage portions of the walls 31 and 32 as a stop. At the same time, the opposite wall portion 41 being engaged between these wall portions 31 and 32, restrains member 40 from pivoting movement on the axis of the pin 36 in the out-of-the-way dotted line position.

The stop mounting member 40 carries a pair of pins 43 and 44 which project outwardly therefrom, as seen in FIGS. 4 and 5, and pass through the enlarged body portion 46 of a stop pin 47. The rod 44 is threaded at its upper end for engagement by a knurled nut 48, to form a stop against which the stop pin 47 is urged by means of a spring 49.

In considering the above construction, it is to be noted that the space between the bifurcated wall portions 41 and 42 of the stop member 40 is only slightly greater than the thickness of the wall of the extension 32a and 31, so that when member 40 is swung about its pivot on the screw 36 with the arm in upright position, as shown in FIGS. 4 and 5, to either of the two dotted line positions shown in FIG. 5, the wall portions 41 and 42 embrace the one or the other of extensions 31a and 32a so as to hold the stop pin 47 substantially against pivoting movement in its active or holding position, for example, as shown in FIGS. 1 and 3.

In the form of the invention shown in FIGS. 6 and 7, the stop mounting lever 61 has a bifurcated upper end providing respective side portions 62 and 63, in which a block 64 is mounted on a pivot pin 66. This pivot being generally similar in location and operation as the screw 33, and the block 64 being generally similar to the block 34. The block 64 at its upper end carries a pivot pin or screw 67 for a stop pawl 68, which in this position can be swung on the pivot 67 in either direction and because the pawl 68 occupies an offset portion of the walls 62 and 63 which provide a stop surface 69 for it in either direction of swing, as illustrated in FIG. 7. Also, this pawl 68 can be pivoted to the left, as shown in FIG. 6, away from the plane of the chain saw to an inactive position in which the body of the pawl 68 is moved into the space between the arms or bifurcated portions 62 and 63, so as to be held thereby against swinging movement.

In operation it will be seen, referring to FIG. 1, that when the grinding wheel 12 is brought into sharpening engagement with the chain saw 70, that the pin 47 is in holding relation with respect to the opposite edge of the tooth of the chain saw being sharpened. Depending upon the width of the tooth, the step can be adjusted so that the tooth is held in a desired position in relation to the grinding wheel 12 for sharpening operation. Alternatively, a stop pin 47 can be swung to position indicated in FIG. 3 when the opposite face of a tooth is to be sharpened as illustrated in connection with the grinding wheel 12.

It will be apparent that the various forms of holding means for the chain saw, as illustrated herein, all relieve the operator of resisting the thrust of the grinding wheel against the successive teeth of the chain saw and thereby enable more accurate work and to enable more work during the day.

While I have shown and described certain preferred forms of the invention, it will be apparent that the invention is capable of variations and modifications from the forms shown so that the scope thereof should be limited only by the scope of the claims appended hereto.

What I claim is.

1. In a sharpener for a chain saw having a pair of endless holding elements for engaging the chain saw, means mounting said holding elements for movement past a sharpening position and means for effecting converging of said elements in holding relation at said sharpening position as said elements are advanced, means for selecting the point of convergence of said sharpening elements including means for selecting at least two different points for sharpening opposite faces of the teeth of the chain saw, a stop element mounted on said sharpener for positioning to engage a tooth of a chain saw to hold it during the sharpening operation, and mounting means for said stop element enabling movement thereof to one position for engaging the saw when one tooth face thereof is to be sharpened, and to another position for engaging the saw when another tooth face thereof is to be sharpened.

2. In a sharpener for a chain saw, a pair of endless holding elements for engaging the chain saw, means for effecting converging of said elements in holding relation at a sharpening position, means for adjusting said converging effecting means to select the position of holding, and a stop for the chain saw mounted on said adjusting means for movement thereon to extend in either one of two directions therefrom in holding relation with respect to the chain saw.

3. In a sharpener for a chain saw, holding means for engaging the chain saw, a mounting member on said sharpener adjusting means on said mounting member for said holding means, and a stop for the chain saw mounted on said adjusting means for movement to extend in either one of two directions therefrom in holding relation with respect to the chain saw.

4. In a sharpener for a chain saw, a holder for the chain saw, a sharpening element mounted for movement to engage a saw in said holder, saw-restraining means including a member pivoted on the saw sharpener about one axis, an element pivoted on said member in a direction perpendicular to said axis, and holding means pivoted on said element in a direction parallel to said axis to adapt said holding means for swinging movement in either direction to be placed in holding relation with respect to the saw.

5. In a sharpener for a chain saw, a holder for the chain saw, a sharpening element mounted for movement to engage a saw in said holder, saw-restraining means including a member pivoted on the saw sharpener about one axis, an element pivoted on said member in a direction perpendicular to said axis, and holding means pivoted on said element in the direction parallel to said axis to adapt said holding means for swinging movement in either direction with relation to the saw, said holding means including a support rod, a stop adjustably mounted on said support rod, a holding finger slidably mounted on said rod, and a spring urging said finger against said stop.

6. In a sharpener for a chain saw, a lever mounted on said sharpener about an axis and having a bifurcated end composed of two spaced apart extensions disposed generally parallel to said lever axis, a block pivotally mounted in and between said extensions about an axis perpendicular to the axis of the lever and perpendicular to said extensions, a bifurcated holding element pivotally mounted on said block in a direction perpendicular to the axis of the block and comprising two portions spaced apart a distance equal to the width of said extensions, one of said portions being of a width to pass freely between said extensions and the other of said portions being of a greater width to form a stop against the edges of said extensions, a guide secured in said bifurcated element and extending outwardly therefrom, a stop pin mounted on said guide for sliding movement thereon, spring means urging said stop pin outwardly with respect to said bifurcated element, and an adjustable stop member mounted on said element and engaged by said pin under the influence of said spring.

7. In a sharpener for a chain saw, a lever mounted for movement on said sharpener about an axis and having a bifurcated end composed of two spaced apart extensions disposed generally parallel to said lever axis, a block pivotally mounted in and between said extensions about an axis perpendicular to the axis of the lever and perpendicular to said extensions, a holding element pivotally mounted about an axis extending on said block in a direction perpendicular to the axis of the block, and stop means on said element, said lever and said element having interengaging portions to limit swinging movement of said element in either direction about its axis, and said block and said lever having other interengaging means to limit swinging movement of said block with said holding element about the axis of the block.

8. In a sharpener for a chain saw, a lever mounted on said sharpener about an axis and having a bifurcated end composed of two spaced apart extensions disposed generally parallel to said lever axis, a block pivotally mounted in and between said extensions about an axis perpendicular to the axis of the lever and perpendicular to said extensions, and a holding element pivotally mounted on said block in a direction perpendicular to the axis of the block and having a width to pass freely between said extensions.

References Cited in the file of this patent
UNITED STATES PATENTS
2,459,233    Mall _____ Jan. 18, 1949